US012218820B2

(12) United States Patent
Li et al.

(10) Patent No.: US 12,218,820 B2
(45) Date of Patent: Feb. 4, 2025

(54) NODE IDENTIFIER TRANSMISSION METHOD, DEVICE, AND SYSTEM

(71) Applicant: HUAWEI TECHNOLOGIES CO., LTD., Guangdong (CN)

(72) Inventors: Wenyan Li, Beijing (CN); Haibo Wang, Beijing (CN); Lili Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 17/895,241

(22) Filed: Aug. 25, 2022

(65) Prior Publication Data

US 2022/0417131 A1 Dec. 29, 2022

Related U.S. Application Data

(63) Continuation of application No. PCT/CN2020/119076, filed on Sep. 29, 2020.

(30) Foreign Application Priority Data

Feb. 26, 2020 (CN) .......................... 202010121129.3

(51) Int. Cl.
*H04L 45/02* (2022.01)
(52) U.S. Cl.
CPC .................... *H04L 45/02* (2013.01)
(58) Field of Classification Search
CPC ....................................................... H04L 45/02
USPC ......................................................... 370/392
See application file for complete search history.

(56) References Cited

U.S. PATENT DOCUMENTS

| 7,002,973 | B2 * | 2/2006 | MeLampy | H04M 7/128 |
| | | | | 709/230 |
| 7,028,092 | B2 * | 4/2006 | MeLampy | H04M 7/128 |
| | | | | 370/392 |
| 10,516,610 | B2 * | 12/2019 | Filsfils | H04L 45/74 |
| 10,924,399 | B2 * | 2/2021 | Filsfils | H04L 45/52 |

(Continued)

FOREIGN PATENT DOCUMENTS

| CN | 103685037 A | 3/2014 |
| CN | 109688057 A | 4/2019 |

(Continued)

OTHER PUBLICATIONS

S. Previdi et al.,"Advertising Segment Routing Policies in BGP draft-ietf-idr-segment-routing-te-policy-08", Nov. 18, 2019,total: 14 pages.

(Continued)

*Primary Examiner* — Anthony Mejia (57) ABSTRACT

Embodiments of this application relate to the communication field, and disclose a method, a device, and a system for transmitting a node identifier, to reduce a limitation on delivery of an SR POLICY route and improve network performance The method includes: A forwarding device sends a node identifier to a controller. The forwarding device receives a first SR POLICY route from the controller, where a target attribute of the first SR POLICY route is the node identifier. The forwarding device determines that the node identifier matches the target attribute of the first SR POLICY route, and forwards a traffic packet according to the first SR POLICY route.

20 Claims, 5 Drawing Sheets

(56) References Cited

U.S. PATENT DOCUMENTS

| | | | | |
|---|---|---|---|---|
| 2018/0131616 A1* | 5/2018 | LaBerge | ................. | H04L 45/02 |
| 2020/0028758 A1* | 1/2020 | Tollet | ...................... | H04L 67/10 |
| 2021/0083933 A1* | 3/2021 | Bull | ....................... | H04L 47/24 |
| 2021/0111991 A1* | 4/2021 | Vadera | .................... | H04L 45/50 |
| 2021/0126831 A1* | 4/2021 | Filsfils | ................. | H04W 76/12 |

FOREIGN PATENT DOCUMENTS

| | | |
|---|---|---|
| CN | 110417631 A | 11/2019 |
| CN | 110708243 A | 1/2020 |
| WO | 2019128950 A1 | 7/2019 |

OTHER PUBLICATIONS

International Search Report and Written Opinion issued in PCT/CN2020/119076, dated Dec. 30, 2020, 9 pages.

\* cited by examiner

NODE IDENTIFIER TRANSMISSION METHOD, DEVICE, AND SYSTEM

CROSS-REFERENCE TO RELATED APPLICATIONS

This application is a continuation of International Application No. PCT/CN2020/119076, filed on Sep. 29, 2020, which claims priority to Chinese Patent Application No. 202010121129.3, filed on Feb. 26, 2020. The disclosures of the aforementioned applications are hereby incorporated by reference in their entities.

TECHNICAL FIELD

Embodiments of this application relate to the communication field, and in particular, to a node identifier transmission method, a device, and a system.

BACKGROUND

During conventional IP network traffic forwarding, when traffic is forwarded to a node, a next-hop device can be determined only by querying an IP routing table on the node. During planning a network, users need to add a configuration on each node of the network to guide traffic. The proposed segment routing (SR) technology enables users to directly customize a complete forwarding path for traffic.

When the SR technology is applied to Internet protocol (IP) forwarding, after collecting a network topology, a controller may calculate an end-to-end SR POLICY route, and deliver the SR POLICY route to a head node of a path by using a border gateway protocol (BGP) SR POLICY address family, and the head node generates an SR POLICY tunnel.

The draft-ietf-idr-segment-routing-te-policy protocol defines a solution for delivering SR POLICY routes. Specifically, in this solution, when delivering an SR POLICY route, a controller configures a route-target attribute as a BGP router-identifier (identifier, ID) of a head node. When receiving the SR POLICY route, the head node matches the BGP router-ID of the head node with the route-target attribute in the SR POLICY route. If the BGP router-ID and the route-target attribute are successfully matched, the controller delivers the SR POLICY route to an SR module on the head node. It is very important for delivery of the SR POLICY route that the controller obtains the B GP router-ID of the head node.

Currently, a controller obtains a BGP router-ID of a forwarding device by reading configuration information of the forwarding device or by querying information about the forwarding device through a NETCONF/YANG interface. However, both have disadvantages. For example, the configuration information can be read only when the BGP router-ID is configured for the forwarding device, rather than through automatic selection. The manner of querying through an interface may encounter a performance bottleneck. Once the BGP router-ID of the forwarding device changes, the controller cannot learn of the change in time, limiting delivery of the SR POLICY route and resulting in poor network performance.

SUMMARY

This application provides a node identifier transmission method, a device, and a system, to reduce a limitation on delivery of an SR POLICY route, and improve network performance.

To achieve the foregoing objective, the following technical solutions are applied to this application.

According to a first aspect, an embodiment of this application provides a node identifier transmission method. The method may include: When a node identifier of a forwarding device changes, the forwarding device sends a changed node identifier to a controller. The forwarding device receives a first SR POLICY route from the controller, where a target attribute of the first SR POLICY route is the changed node identifier. The forwarding device determines that the node identifier matches the target attribute of the first SR POLICY route, and forwards a traffic packet according to the first SR POLICY route.

According to the node identifier transmission method provided in this application, when the node identifier of the forwarding device to be compared with the target attribute of the SR POLICY route changes, the forwarding device proactively sends the changed node identifier to the controller, to ensure that the controller accurately obtains, in time, the node identifier of the forwarding device to be compared with the target attribute of the SR POLICY route. This reduces a limitation on delivery of an SR POLICY route and improves network performance The node identifier may be compared with the target attribute of the SR POLICY route when the forwarding device receives the SR POLICY route. The target attribute of the SR POLICY route is content of a latest node identifier of a head node.

With reference to the first aspect, in a possible implementation, that the forwarding device sends a changed node identifier to a controller may be specifically implemented as follows: The forwarding device floods the changed node identifier, and reports the changed node identifier by using a flooding mechanism.

With reference to the first aspect, in another possible implementation, that the forwarding device sends a changed node identifier to a controller may be specifically implemented as follows: The forwarding device sends the changed node identifier directly to the controller, to avoid reporting redundancy when the forwarding device belongs to a plurality of autonomous systems.

With reference to any one of the first aspect or the foregoing possible implementations, in another possible implementation, the node identifier may include a BGP router-ID or a traffic engineering (TE) router-ID.

With reference to any one of the first aspect or the foregoing possible implementations, in another possible implementation, the first SR POLICY route may further include a type indication, and the type indication indicates a type of the node identifier of the forwarding device to be compared with the target attribute of the SR POLICY route. Correspondingly, that the forwarding device determines that the node identifier to be compared with the target attribute of the SR POLICY route matches the target attribute of the first SR POLICY route may be specifically implemented as follows: The forwarding device determines that the node identifier indicated by the type indication matches the target attribute of the first SR POLICY route.

With reference to any one of the first aspect or the foregoing possible implementations, in another possible implementation, the target attribute may be a route-target attribute.

According to a second aspect, an embodiment of this application provides another node identifier transmission method. The method may include: A controller receives a changed node identifier sent by a forwarding device when a node identifier of the forwarding device changes, where the forwarding device is managed by the controller. The controller generates a first SR POLICY route whose head node is the forwarding device, where a target attribute of the first SR POLICY route is the changed node identifier. The controller sends the first SR POLICY route to the forwarding device.

According to the node identifier transmission method provided in this application, when the node identifier of the forwarding device to be compared with the target attribute of the SR POLICY route changes, the forwarding device proactively sends the changed node identifier to the controller, to ensure that the controller accurately obtains, in time, the node identifier of the forwarding device to be compared with the target attribute of the SR POLICY route. This reduces a limitation on delivery of the SR POLICY route and improves network performance.

The node identifier is used to configure the target attribute of the SR POLICY route whose head node is the forwarding device. The target attribute of the SR POLICY route configured by the controller is content of a latest node identifier of the head node.

With reference to the second aspect, in a possible implementation, that a controller receives a changed node identifier sent by a forwarding device when a node identifier of the forwarding device changes may be specifically implemented as follows: The controller receives the changed node identifier flooded by the forwarding device when the node identifier of the forwarding device changes, and reports the node identifier by using a flooding mechanism.

With reference to the second aspect, in another possible implementation, that a controller receives a changed node identifier sent by a forwarding device when a node identifier of the forwarding device changes may be specifically implemented as follows: The controller receives the changed node identifier sent by the forwarding device directly to the controller when the node identifier of the forwarding device changes, to avoid reporting redundancy when the forwarding device belongs to a plurality of autonomous systems.

With reference to any one of the second aspect or the foregoing possible implementations, in another possible implementation, the node identifier may include a BGP router-ID or a TE router-ID.

With reference to any one of the second aspect or the foregoing possible implementations, in another possible implementation, the first SR POLICY route may further include a type indication, and the type indication indicates a type of the target attribute of the first SR POLICY route.

With reference to any one of the second aspect or the foregoing possible implementations, in another possible implementation, the target attribute may be a route-target attribute.

According to a third aspect, an embodiment of this application further provides a forwarding device. The forwarding device may include a sending unit, a receiving unit, a determining unit and a processing unit.

The sending unit is configured to send a changed node identifier to a controller when a node identifier of the forwarding device changes.

The receiving unit is configured to receive a first SR POLICY route from the controller, where a target attribute of the first SR POLICY route is the changed node identifier.

The determining unit is configured to determine that the node identifier matches the target attribute of the first SR POLICY route.

The processing unit is configured to: when the determining unit determines that the node identifier matches the target attribute of the first SR POLICY route, forward a traffic packet according to the first SR POLICY route.

It should be noted that specific implementations of the units in the third aspect are the same as those described in the method in the first aspect.

According to a fourth aspect, an embodiment of this application provides another forwarding device. The forwarding device may implement functions in the examples of the method in the first aspect. The functions may be implemented by hardware, or may be implemented by hardware by executing corresponding software. The hardware or the software includes one or more modules corresponding to the foregoing functions. The forwarding device may exist in a product form of a chip.

With reference to the fourth aspect, in a possible implementation, a structure of the forwarding device includes a processor and a transceiver. The processor is configured to support the forwarding device in performing corresponding functions in the method. The transceiver is configured to support communication between the forwarding device and another device. The forwarding device may further include a memory. The memory is configured to be coupled to the processor, and store program instructions and data that are necessary for the forwarding device.

According to a fifth aspect, an embodiment of this application further provides a controller. The controller may include a receiving unit, a generation unit, and a sending unit.

The receiving unit is configured to receive a changed node identifier sent by a forwarding device when a node identifier of the forwarding device changes, where the forwarding device is managed by the controller.

The generation unit is configured to generate a first SR POLICY route whose head node is the forwarding device, where a target attribute of the first SR POLICY route is the changed node identifier.

The sending unit is configured to send the first SR POLICY route generated by the generation unit to the forwarding device.

It should be noted that specific implementations of the units in the fifth aspect are the same as those described in the method in the second aspect.

According to a sixth aspect, an embodiment of this application provides another controller. The controller may implement functions in the examples of the method in the second aspect. The functions may be implemented by hardware, or may be implemented by hardware by executing corresponding software. The hardware or the software includes one or more modules corresponding to the foregoing functions. The controller may exist in a product form of a chip.

With reference to the sixth aspect, in a possible implementation, a structure of the controller includes a processor and a transceiver. The processor is configured to support the controller in performing corresponding functions in the method. The transceiver is configured to support communication between the controller and another device. The controller may further include a memory. The memory is configured to be coupled to the processor, and store program instructions and data that are necessary for the controller.

According to a seventh aspect, an embodiment of this application provides a communication system, including the controller in any one of the foregoing aspects, and one or more forwarding devices in any one of the foregoing aspects, where the forwarding devices are controlled by the controller.

According to an eighth aspect, a computer-readable storage medium including instructions is provided. When the instructions are run on a computer, the computer is enabled to perform the node identifier transmission method in any one of the foregoing aspects or the foregoing possible implementations.

According to a ninth aspect, a computer program product including instructions is provided. When the instructions are run on a computer, the computer is enabled to perform the node identifier transmission method in any one of the foregoing aspects or the foregoing possible implementations.

According to a tenth aspect, an embodiment of this application provides a chip system. The chip system includes a processor, and may further include a memory, and the chip system is configured to implement functions in the method in any one of the foregoing aspects. The chip system may include a chip, or may include a chip and another discrete device.

Various possible implementations in any one of the foregoing aspects may be combined on a premise that solutions are not contradictory.

It should be noted that the solutions in any one of the third aspect to the ninth aspect are used to perform the method in any one of the first aspect or the second aspect or the possible implementations, and can achieve a same effect.

DESCRIPTION OF EMBODIMENTS

In embodiments of this application, to clearly describe technical solutions in embodiments of this application, words such as "first" and "second" are used to distinguish between same items or similar items whose functions are basically the same. A person skilled in the art may understand that the words such as "first" and "second" do not limit a quantity and an execution sequence, and the words such as "first" and "second" do not indicate a definite difference either. There is no chronological order or no size order between the technical features described by the "first" and the "second".

In embodiments of this application, the word "example", "for example", or the like is used to represent giving an example, an illustration, or a description. Any embodiment or design scheme described as an "example" or with "for example" in embodiments of this application shall not be explained as being more preferred or having more advantages than other embodiments or design schemes. Exactly, use of the word such as "example" or "for example" is intended to present a relative concept in a specific manner for ease of understanding.

In the descriptions of this application, "l" represents an "or" relationship between associated objects unless otherwise specified. For example, A/B may represent A or B. The term "and/or" in this application represents only an association relationship for describing associated objects and represents that three relationships may exist. For example, A and/or B may represent any one of the three cases: Only A exists, both A and B exist, or only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In embodiments of this application, "at least one" may also be described as "one or more", and "a plurality of" may be "two, three, four, or more". This is not limited in this application.

It should be noted that in this application, A sends content to B. When A and B are not directly connected in a network architecture, the content may be forwarded level by level through a network element between A and B, so that the content reaches B. In this specification, it indicates that "A sends the content to B".

In addition, a network architecture and a scenario described in embodiments of this application are intended to describe the technical solutions in embodiments of this application more clearly, and constitute no limitation on the technical solutions provided in embodiments of this application. A person of ordinary skill in the art may learn that, with evolution of the network architecture and emergence of a new scenario, the technical solutions provided in embodiments of this application are also applicable to similar technical problems.

Before embodiments of this application are described, nouns in this application are explained and described herein.

A controller is a network device configured to manage forwarding devices in a centralized manner in a network. The controller may be further configured to calculate, according to a path calculation algorithm, a transmission path for packet forwarding, and deliver information about a forwarding node on the transmission path to a head node, where the information about the forwarding node is used as a route.

The head node (which may also be referred to as a first node, an ingress node, or the like) is a node device that generates a packet.

The transmission path (which may also be referred to as a route) is a path including node devices that a packet passes through in a transmission process.

An SR POLICY route may be an end-to-end transmission path when the SR technology is applied to IP transmission. The SR POLICY route can be calculated by the controller. The controller delivers the SR POLICY route to the head node by using a BGP SR POLICY address family.

The BGP SR POLICY address family is a manner of transmitting the SR POLICY routes by using a BGP protocol. In different IP technologies, types of BGP SR POLICY address families are different. This is not limited in this application.

For example, the BGP SR POLICY address family may include a BGP Internet protocol version 4 (IPv4) segment routing (IPv4 segment routing, SRv4) POLICY address family and a BGP SRv6 POLICY address family. The BGP SRv4 POLICY address family transmits a multiprotocol label switching (MPLS) label to generate an SRv4 POLICY route for forwarding traffic whose destination address is an IPv4 address. The BGP SRv6 POLICY address family transmits an IPv6 segment ID to generate an SRv6 POLICY route. When the SR technology is applied to the Internet protocol version 4 (IPv4), the controller can calculate an end-to-end IPv4 segment routing (SRv4) POLICY route, and transmit the SRv4 POLICY route by using the SRv4 POLICY address family. When the SR technology is applied to the IPv6, the controller can calculate an end-to-end SRv6 POLICY route, and transmit the SRv6 POLICY route by using the SRv6 POLICY address family.

As described above, the draft-ietf-idr-segment-routing-te-policy protocol defines a solution for delivering an SR POLICY route. When delivering an SR POLICY route, the controller configures a route-target attribute as a BGP router-ID of the head node. After receiving the SR POLICY route, the head node matches the BGP router-ID of the head node with the route-target attribute in the SR POLICY route. Therefore, it is very important for delivery of the SR POLICY route that the controller obtains the BGP router-ID of the head node.

However, when the controller obtains the BGP router-ID by reading configuration information of the forwarding device or by querying information about the forwarding device through a NETCONF/YANG interface, the controller cannot obtain an automatically selected BGP router-ID. The manner of querying through an interface may encounter a performance bottleneck. In addition, in a current obtaining manner, when the BGP router-ID changes, the controller cannot accurately obtain the BGP router-ID in time, and delivery of the SR POLICY route is limited, and poor network performance is caused.

In view of this, an embodiment of this application provides a node identifier transmission method. When a node identifier of a forwarding device to be compared with a target attribute of an SR POLICY route changes, the forwarding device proactively sends a changed node identifier to a controller, to ensure that the controller accurately obtains, in time, the node identifier of the forwarding device to be compared with the target attribute of the SR POLICY route. This reduces a limitation on delivery of the SR POLICY route and improves network performance.

Figure 1:
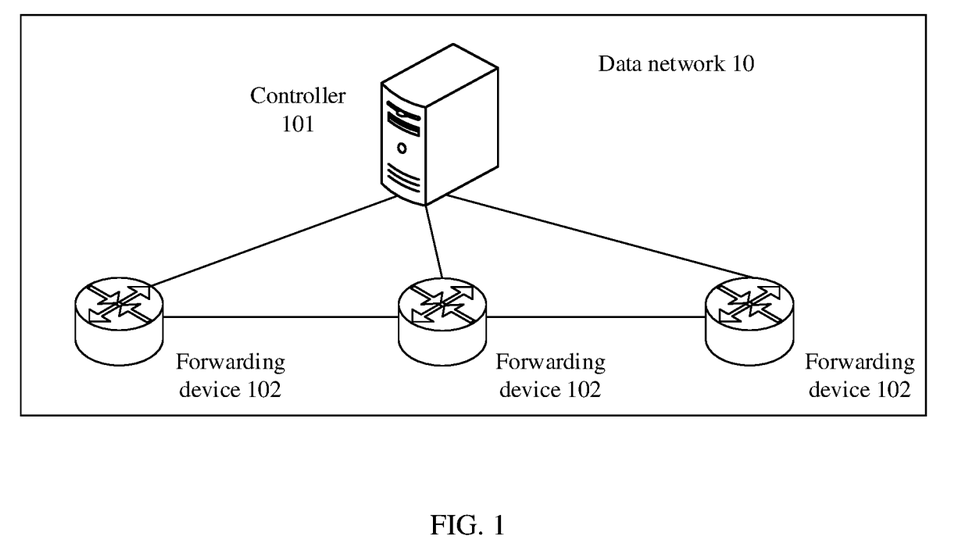
FIG. 1 is a schematic diagram of an architecture of a data network according to an embodiment of this application.

The node identifier transmission method provided in this embodiment is applicable to a data network 10 shown in FIG. 1. The data network 10 may be a communication network, or may be a computer network. A type of the data network is not specifically limited in this application. As shown in FIG. 1, the data network 10 includes a controller 101 and a plurality of forwarding devices 102. The forwarding device 102 may also be referred to as a node device, a forwarding node, or the like.

The controller 101 may be a server having a management capability and a path calculation capability or another type of network device. The forwarding device 102 may be a switch, a router, or another network device having a traffic packet forwarding capability. An actual product form of the controller 101 and an actual product form of the forwarding device 102 are not limited in this embodiment.

Specifically, the controller 101 may be configured to manage the forwarding devices 102. For example, the controller 101 may calculate an end-to-end SR POLICY route, and deliver the end-to-end SR POLICY route to a head node of the route. After receiving the SR POLICY route, the head node matches a node identifier of the head node to be compared with a target attribute of the SR POLICY route. After the node identifier and the target attribute are successfully matched (the comparison result shows that the node identifier is the same as the target attribute), the head node forwards a traffic packet according to the received SR POLICY route.

It should be noted that a quantity of devices included in the data network 10 and a specific architecture may be configured based on an actual requirement. A scale and a specific architecture of the data network 10 are not limited in this embodiment of this application.

Further, the forwarding device 102 in the data network 10 may establish a BGP-LS peer relationship with the controller 101, and the controller 101 may collect a basic network topology by using the forwarding device 102 that establishes the BGP-LS peer relationship with the controller 101, to calculate the end-to-end SR POLICY route.

In a possible implementation, when collecting the basic network topology, the controller 101 may collect each node identifier of each forwarding device managed by the controller 101, to configure a target attribute of an SR POLICY route, where each node identifier is to be compared with the target attribute of the SR POLICY route.

Figure 2:
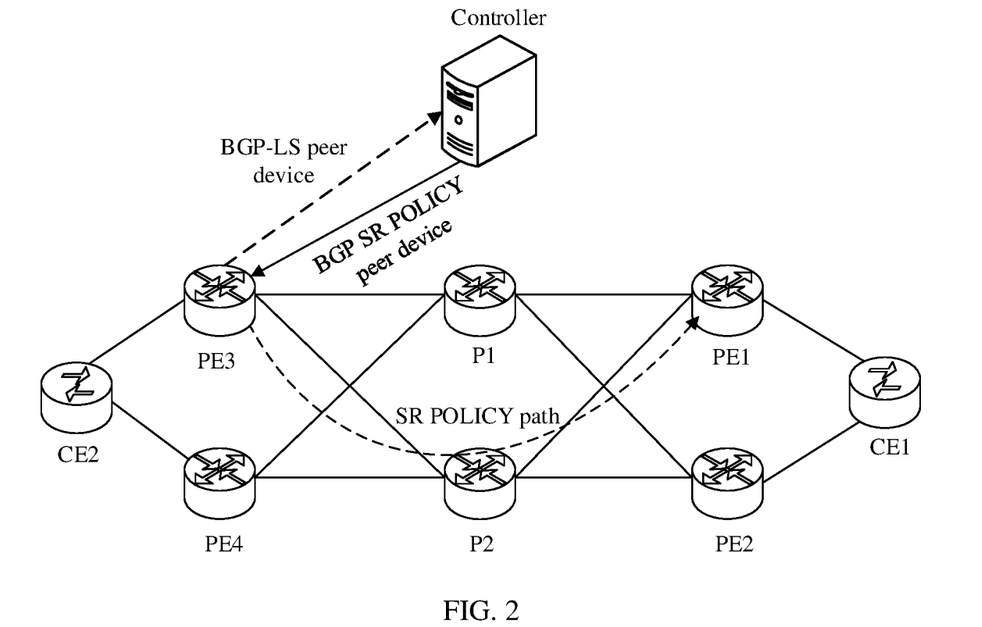
FIG. 2 is a schematic diagram of an architecture of an SRv6 network according to an embodiment of this application.

For example, in an SRv6 network architecture shown in FIG. 2, a forwarding device PE3 establishes a BGP-LS peer relationship with a controller. In other words, the PE3 establishes a BGP SRv6 POLICY peer relationship with the controller. The controller may collect a basic network topology by using a BGP-LS peer device (PE3), and may collect each node identifier of each forwarding device managed by the controller, to configure a route-target attribute of an SR POLICY route, where the node identifier is to be compared with the target attribute of the SR POLICY route.

If an end-to-end SR POLICY route from the PE3 to PE1 calculated by the controller is PE3-P2-PE1, the controller may deliver a BGP SRv6 POLICY route to the head node PE3. A route-target attribute of the BGP SRv6 POLICY route is a node identifier of the PE3 to be compared with the target attribute of the SR POLICY route. After receiving the BGP SRv6 POLICY route, the PE3 compares the node identifier of the PE3 with the route-target attribute of the BGP SRv6 POLICY route. After the node identifier and the target attribute are successfully matched (the comparison result shows that the node identifier is the same as the target attribute), the PE3 forwards a traffic packet to PE1 according to the received SR POLICY route.

The following describes embodiments of this application in detail with reference to the accompanying drawings.

According to an aspect, an embodiment of this application provides a network device, configured to perform a node identifier transmission method provided in this application.

Figure 3:
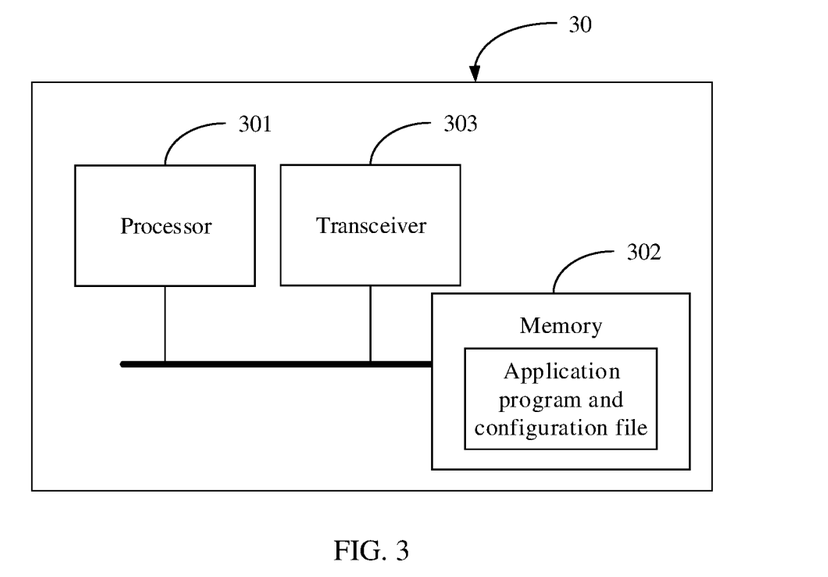
FIG. 3 is a schematic diagram of a structure of a network device according to an embodiment of this application.

The network device may be a controller or a forwarding device. FIG. 3 shows a network device 30 related to embodiments of this application. As shown in FIG. 3, the network device 30 may include a processor 301, a memory 302, and a transceiver 303.

The following specifically describes components of the network device 30 with reference to FIG. 3.

The memory 302 may be a volatile memory, such as a random access memory (RAM); or a non-volatile memory, such as a read-only memory (ROM), a flash memory, a hard disk drive (HDD), or a solid-state drive (SSD); or a combination of the foregoing types of memories, configured to store program code, a configuration file, or other content that can implement the method in this application.

The processor 301 is a control center of the network device 30. For example, the processor 301 may be a central processing unit (CPU), or may be an application-specific integrated circuit (ASIC), or may be configured as one or more integrated circuits implementing embodiments of this application, for example, one or more microprocessors (DSP), or one or more field programmable gate arrays (FPGA).

The transceiver 303 is configured to communicate with another device. The transceiver 303 may be a communication port of the network device 30 or the like.

In a possible implementation, when the network device 30 is a forwarding device, the processor 301 runs or executes a software program and/or a module stored in the memory 302, and invokes data stored in the memory 302, to perform the following functions:

when a node identifier of the network device 30 changes, sending a changed node identifier to a controller by using the transceiver 303; receiving a first SR POLICY route from the controller, where a target attribute of the first SR POLICY route is the changed node identifier; and determining that the node identifier matches the target attribute of the first SR POLICY route, and forwarding a traffic packet according to the first SR POLICY route.

In another possible implementation, when the network device 30 is a controller, the processor 301 runs or executes a software program and/or a module stored in the memory 302, and invokes data stored in the memory 302, to perform the following functions:

receiving, by using the transceiver 303, a changed node identifier sent by a forwarding device when a node identifier of the forwarding device changes, where the forwarding device is managed by the network device 30; generating a first SR POLICY route whose head node is the forwarding device, where a target attribute of the first SR POLICY route is the changed node identifier; and sending the first SR POLICY route to the forwarding device by using the transceiver 303.

According to another aspect, an embodiment of this application provides a node identifier transmission method, applied to an interaction process between a controller and a forwarding device managed by the controller. It should be noted that an interaction process between the controller and each forwarding device managed by the controller is similar. In this embodiment of this application, an interaction process between the controller and one forwarding device managed by the controller is merely an example to describe in detail the solution provided in this application.

Figure 4:
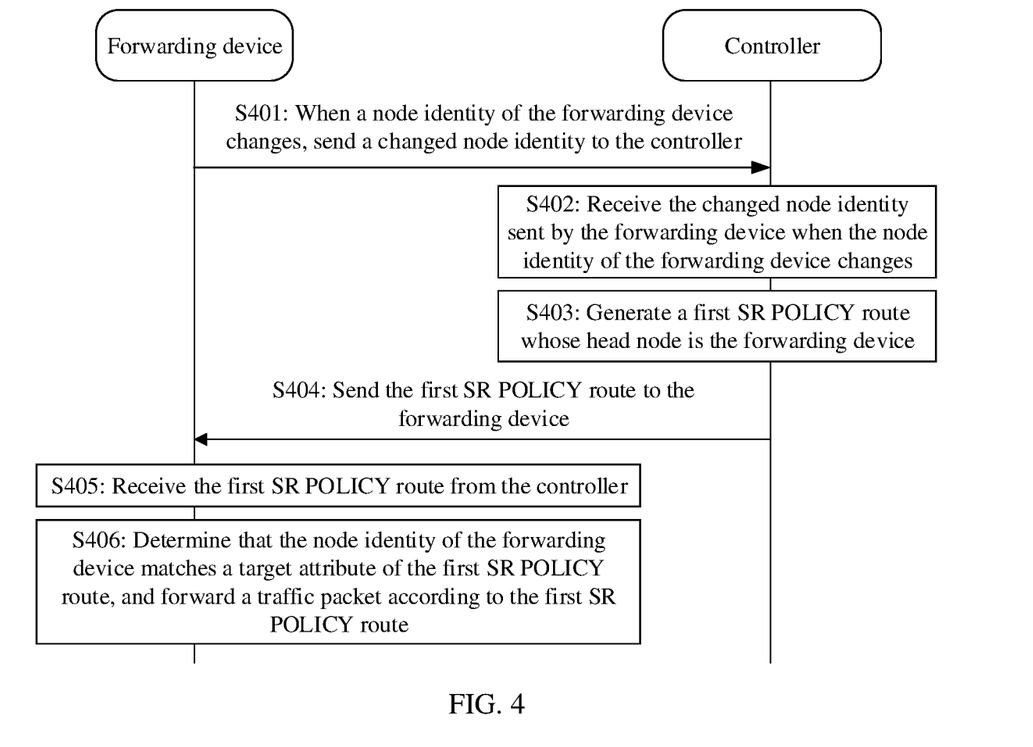
FIG. 4 is a schematic flowchart of a node identifier transmission method according to an embodiment of this application.

As shown in FIG. 4, the node identifier transmission method according to this embodiment may include the following steps.

S401: When a node identifier of the forwarding device changes, the forwarding device sends a changed node identifier to the controller.

The node identifier is to be compared with a target attribute of an SR POLICY route when the forwarding device receives the SR POLICY route.

In a possible implementation, the node identifier may be a global identifier of the forwarding device.

For example, a type of the node identifier may include a BGP router-ID, a TE router-ID, a system-ID, or another type. Any identifier that may be used to compare with the target attribute of the SR POLICY route may be the node identifier in this application.

Optionally, content of the node identifier may be configured by an administrator of the forwarding device, automatically selected by the forwarding device, or changed in another manner. This is not limited in this embodiment of this application.

Optionally, in S401, a manner in which the forwarding device sends the changed node identifier to the controller may include but is not limited to any one of the following two possible implementations (Implementation A and Implementation B).

Implementation A: The forwarding device floods the changed node identifier.

In Implementation A, the forwarding device floods the changed node identifier (latest content of the node identifier), as an attribute of flooding, in a domain. When collecting a network topology, a BGP-LS peer device of the controller collects the changed node identifier, and the BGP-LS peer device of the controller reports the changed node identifier to the controller.

For example, it is assumed that the node identifier is a BGP router-ID, and when the BGP router-ID changes, in S401, the forwarding device may flood a changed (latest) BGP router-ID, as an attribute of IGP flooding, in the domain by using an IGP. When the BGP-LS peer device of the controller collects an IGP topology, an IGP module in the forwarding device may report the changed BGP router-ID, as a node attribute, to the BGP-LS peer device, and the BGP-LS peer device encapsulates collected BGP router-ID information of the forwarding device into a BGP-LS node route, and reports the BGP-LS node route to the controller.

Implementation B: The forwarding device sends the changed node identifier to the controller.

In Implementation A, the intra-domain flooding manner has a disadvantage. When the forwarding device belongs to a plurality of IGP domains, a same forwarding device may report a node identifier to the controller for a plurality of times, and redundancy is caused. Therefore, in Implementation B, the forwarding device may send the changed node identifier to the controller in S401.

Specifically, in Implementation B, a message for reporting the node identifier to be compared with the target attribute of the SR POLICY route may be added.

Further, in Implementation B, the forwarding device may send the changed node identifier directly to the controller, or may send the changed node identifier to the controller through forwarding by another device. This is not limited in this embodiment.

S402: The controller receives the changed node identifier sent by the forwarding device when the node identifier of the forwarding device changes.

It should be noted that the changed node identifier received by the controller in S402 is the changed node identifier sent by the forwarding device in S401.

In a possible implementation, in correspondence with Implementation A in S401, that the controller receives the changed node identifier sent by the forwarding device when the node identifier of the forwarding device changes in S402 may specifically include: The controller receives the changed node identifier flooded by the forwarding device when the node identifier of the forwarding device changes.

In another possible implementation, in correspondence with Implementation B in S401, that the controller receives the changed node identifier sent by the forwarding device when the node identifier of the forwarding device changes in S402 may specifically include: The controller receives the changed node identifier sent by the forwarding device when the node identifier of the forwarding device changes.

It should be noted that the controller may receive, in S402, each changed node identifier sent by each forwarding device managed by the controller when each node identifier of each forwarding device changes.

After S402, after determining a transmission path according to a transmission path calculation algorithm, the controller configures the target attribute of the SR POLICY route as a latest node identifier of a head node, and delivers the SR POLICY route to the head node.

For example, after S402, the controller may perform a procedure from S403 to S406 after determining, according to the transmission path calculation algorithm, the transmission path whose head node is the forwarding device described in this application.

S403: The controller generates a first SR POLICY route whose head node is the forwarding device.

A target attribute of the first SR POLICY route is the changed node identifier of the forwarding device.

For example, the target attribute may be a route-target attribute.

Further, the first SR POLICY route may further include a type indication, and the type indication may indicate a type of the target attribute of the first SR POLICY route. The type may be a BGP router-ID, a TE router-ID, or the like.

For example, when a type of the node identifier is a TE router-ID, the type indication included in the first SR POLICY route may indicate that the type of the target attribute of the first SR POLICY route is a TE router-ID.

For example, Table 1 shows a packet format of the target attribute part of the first SR POLICY route, where the packet format includes a type indication.

TABLE 1

| 0 to 4 | 5 to 8 | 9 to 12 | 13 to 16 | 17 to 20 | 21 to 24 | 25 to 28 | 29 to 32 |
|---|---|---|---|---|---|---|---|
| 0x01 or 0x41 | | Sub-type | | | IP address | | |
| | IP address | | | | | Type indication | |

It should be noted that Table 1 is merely an example for the packet format of the target attribute part of the first SR POLICY route, and does not specifically limit the packet format of the target attribute part of the first SR POLICY route.

S404: The controller sends the first SR POLICY route to the forwarding device.

Specifically, in S404, the controller sends the first SR POLICY route to the forwarding device that is the head node.

Optionally, the controller may send, according to the network topology, the first SR POLICY route to the forwarding device directly or through forwarding by another device.

S405: The forwarding device receives the first SR POLICY route from the controller.

It should be noted that the first SR POLICY route received by the forwarding device from the controller in S405 is the first SR POLICY route sent by the controller to the forwarding device in S404.

Further, after the forwarding device receives the first SR POLICY route from the controller in S405, the forwarding device compares the node identifier of the forwarding device with the target attribute of the first SR POLICY route. If the node identifier is the same as the target attribute of the first SR POLICY route, the forwarding device determines that the node identifier and the target attribute are successfully matched and performs S406. If the node identifier is different from the target attribute of the first SR POLICY route, the forwarding device determines that the node identifier and the target attribute are not matched and ignores the first SR POLICY route.

Optionally, that the forwarding device compares the node identifier of the forwarding device with the target attribute of the SR POLICY route when the first SR POLICY route further includes a type indication may be specifically implemented as follows: The forwarding device compares, based on an indication of the type indication, the node identifier indicated by the type indication with the target attribute of the first SR POLICY route.

S406: The forwarding device determines that the node identifier of the forwarding device matches the target attribute of the first SR POLICY route, and forwards a traffic packet according to the first SR POLICY route.

In S406, that the forwarding device determines that the node identifier of the forwarding device matches the target attribute of the first SR POLICY route may be alternatively implemented as follows: The forwarding device determines that the node identifier of the forwarding device to be compared with the target attribute of the SR POLICY route matches the target attribute of the first SR POLICY route.

Optionally, that the forwarding device determines that the node identifier matches the target attribute of the first SR POLICY route when the first SR POLICY route further includes a type indication includes: The forwarding device determines that the node identifier indicated by the type indication matches the target attribute of the first SR POLICY route.

According to the node identifier transmission method provided in this application, when the node identifier of the forwarding device to be compared with the target attribute of the SR POLICY route changes, the forwarding device proactively sends the changed node identifier to the controller, to ensure that the controller accurately obtains, in time, the node identifier of the forwarding device to be compared with the target attribute of the SR POLICY route. This reduces a limitation on delivery of the SR POLICY route and improves network performance.

It should be noted that an execution sequence of the steps included in FIG. 4 may be configured based on an actual requirement. FIG. 4 merely shows a possible execution sequence, and constitutes no limitation on the execution sequence of the steps.

The following describes a transmission process of a node identifier of the forwarding device P1 to the controller in the architecture of the SRv6 network shown in FIG. 2 as an example to describe the solution provided in this application.

Embodiment 1

The node identifier of the forwarding device to be compared with the target attribute of the SR POLICY route is a BGP router-ID, and the forwarding device sends the BGP router-ID to the controller through intra-domain flooding.

Figure 5:
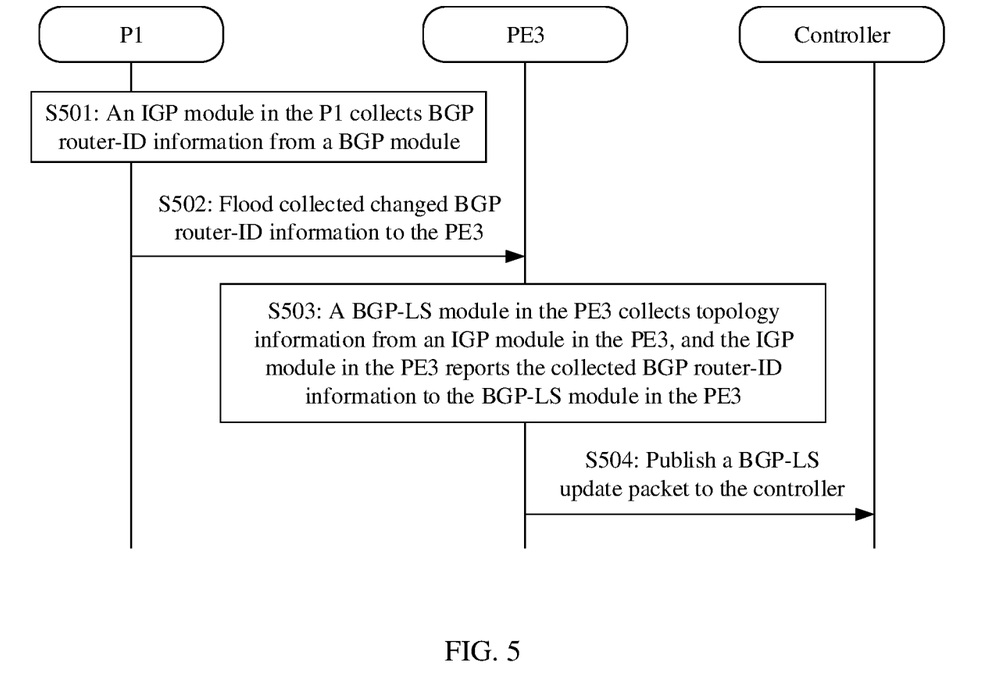
FIG. 5 is a schematic flowchart of another node identifier transmission method according to an embodiment of this application.

FIG. 5 shows a process of transmitting a BGP router-ID of the forwarding device P1 to the controller in Embodiment 1. A node identifier transmission method according to Embodiment 1 may include the following steps.

S501: An interior gateway protocol (IGP) module in the P1 collects BGP router-ID information from a BGP module.

S502: When the BGP router-ID changes, the IGP module in the P1 floods collected changed BGP router-ID information to a neighboring peer device (PE3).

For example, in S502, a new threshold limit value (TLV) carrying the BGP router-ID may be added to the information flooded by the IGP module. A location, content, a form, and the like of the new TLV are not limited in this embodiment of this application.

S503: A BGP-LS module in the PE3 collects topology information from an IGP module in the PE3, and the IGP module in the PE3 reports the collected BGP router-ID information to the BGP-LS module in the PE3.

S504: The PE3 publishes a BGP-LS update packet to the controller.

In S504, after collecting the topology information from the IGP module, the PE3 encapsulates the topology information into the BGP-LS update packet, and publishes the BGP-LS update packet to the controller by using the BGP-LS peer relationship.

For example, the PE3 may add the BGP router-ID to a BGP-LS node route attribute, to report the BGP router-ID to the controller. Table 2 shows a format of a packet in which the BGP router-ID is carried in the BGP-LS node route attribute.

TABLE 2

| Sub-TLV type (BGP router-ID) | Length = 4 |
|---|---|
| BGP router-ID | |

It should be noted that Table 2 is merely an example for the format of the packet in which the BGP router-ID is carried in the BGP-LS node route attribute, and does not specifically limit the format of the packet in which the BGP router-ID is carried in the BGP-LS node route attribute.

Embodiment 2

The node identifier of the forwarding device to be compared with the target attribute of the SR POLICY route is a BGP router-ID, and the forwarding device proactively sends the BGP router-ID to the controller when the BGP router-ID changes.

Figure 6:
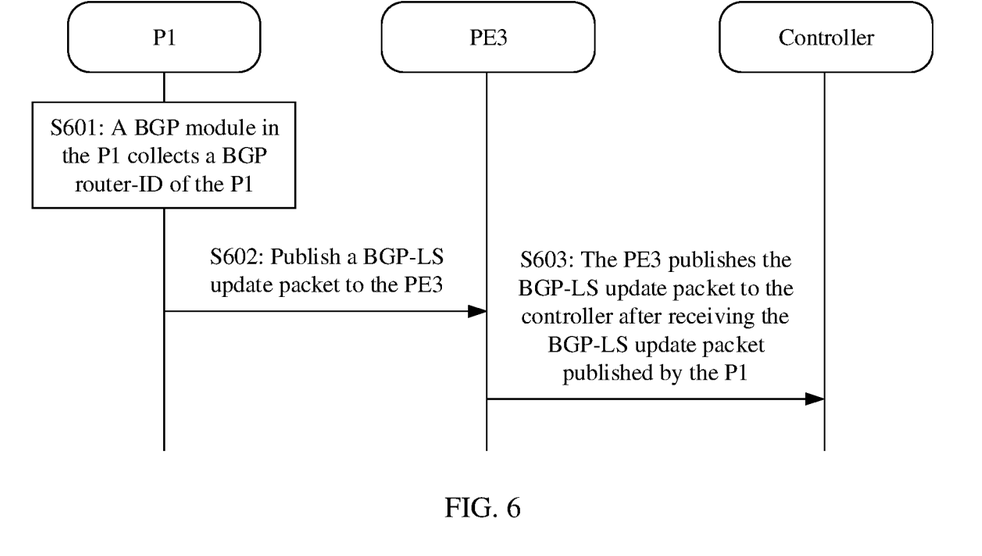
FIG. 6 is a schematic flowchart of still another node identifier transmission method according to an embodiment of this application.

FIG. 6 shows a process of transmitting the BGP router-ID of the forwarding device P1 to the controller in Embodiment 2. A node identifier transmission method according to Embodiment 2 may include the following steps.

S601: A BGP module in the P1 collects the BGP router-ID of the P1.

S602: The P1 publishes a BGP-LS update packet to the PE3.

In S602, when the BGP router-ID changes, the P1 encapsulates the collected BGP router-ID of the P1 into the BGP-LS update packet, and publishes the BGP-LS update packet to the PE3.

For example, an overall packet format of the BGP-LS update packet may be shown in Table 3.

TABLE 3

| Physical node information (physical node Network Layer Reachability Information (NLRI)) | Local node description |
|---|---|
| Physical node attribute | Optional non-transitive attribute |

For example, the local node description field in the overall packet format of the BGP-LS update packet shown in Table 3 may be used to carry the TLV shown in Table 2.

S603: The PE3 publishes the BGP-LS update packet to the controller after receiving the BGP-LS update packet published by the P1.

Embodiment 3

The node identifier of the forwarding device to be compared with the target attribute of the SR POLICY route is a TE router-ID, and the forwarding device proactively sends the TE router-ID to the controller when the TE router-ID changes.

Figure 7:
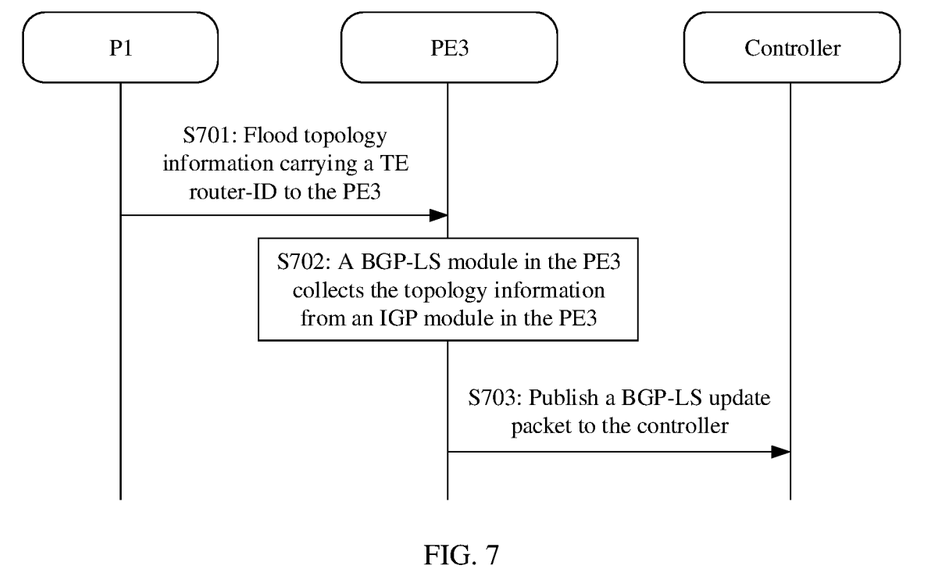
FIG. 7 is a schematic flowchart of yet another node identifier transmission method according to an embodiment of this application.

FIG. 7 shows a process of transmitting the TE router-ID of the forwarding device P1 to the controller in Embodiment 3. A node identifier transmission method in Embodiment 3 may include the following steps.

S701: When the TE router-ID of the P1 changes, an IGP module in the P1 floods topology information carrying the TE router-ID to a neighboring peer device PE3.

S702: A BGP-LS module in the PE3 collects the topology information from an IGP module in the PE3.

S703: The PE3 publishes a BGP-LS update packet to the controller.

In S703, the BGP-LS module in the PE3 encapsulates the topology information into the BGP-LS update packet, and publishes the BGP-LS update packet to the controller by using the BGP-LS peer relationship.

The foregoing mainly describes solutions provided in embodiments of this application from a perspective of a working principle of an interaction process between the forwarding device and the controller. It may be understood that to implement the foregoing functions, the forwarding device and the controller include corresponding hardware structures and/or software modules for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of technical solutions. A person skilled in the art may use different methods to implement the described functions for each particular application, but it should not be considered that the implementation goes beyond the scope of this application.

In embodiments of this application, the forwarding device and the controller may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example, and is merely a logical function division. During actual implementation, another division manner may be used.

Figure 8:
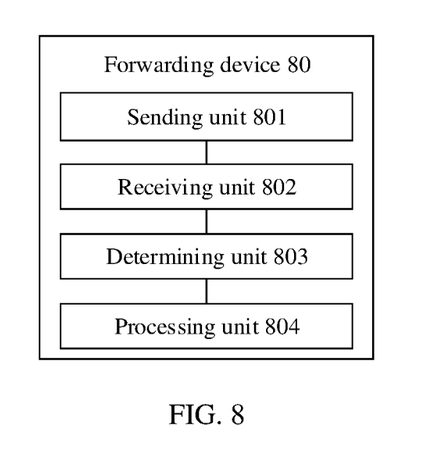
FIG. 8 is a schematic diagram of a structure of a forwarding device according to an embodiment of the present invention.

When functional modules are divided based on corresponding functions, FIG. 8 is a schematic diagram of a structure of a forwarding device 80 in this embodiment. As shown in FIG. 8, the forwarding device 80 may include a sending unit 801, a receiving unit 802, a determining unit 803, and a processing unit 804. The sending unit 801 is configured to perform the step S401 in FIG. 4. The receiving unit 802 is configured to perform the step S405 in FIG. 4. The determining unit 803 is configured to perform the step S406 in FIG. 4. The processing unit 804 is configured to perform the step S406 in FIG. 4. All related content of the steps in this method embodiment may be cited in function descriptions of corresponding functional modules.

Figure 9:
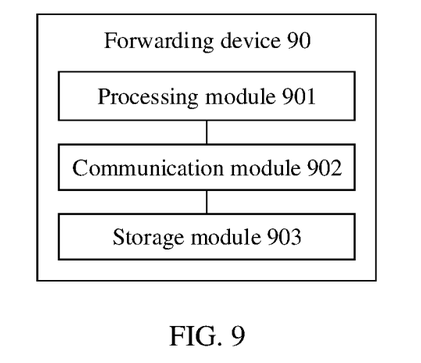
FIG. 9 is a schematic diagram of a structure of another forwarding device according to an embodiment of the present invention.

When an integrated unit is used, FIG. 9 is a schematic diagram of a possible structure of a forwarding device 90 in this embodiment. As shown in FIG. 9, the forwarding device 90 may include a processing module 901 and a communication module 902. The processing module 901 is configured to control and manage an action of the forwarding device 90, and the communication module 902 is configured to communicate with another device. For example, the processing module 901 is configured to perform the step S406 in FIG. 4. The processing module 901 may be further configured to perform the steps S401 and S405 in FIG. 4 by using the communication module 902. The forwarding device 90 may further include a storage module 903, configured to store program code and data of the forwarding device 90.

The processing module 901 may be the processor 301 in a physical structure of the network device 30 shown in FIG. 3, or may be a processor or a controller. For example, the processing module 901 may be a CPU, a general-purpose processor, a DSP, an ASIC, an FPGA or another programmable logic device, a transistor logic device, a hardware component, or any combination thereof. The processing module 901 may implement or execute various example logical blocks, modules, and circuits described with reference to content disclosed in this application. Alternatively, the processor 901 may be a combination for implementing a computing function, for example, a combination including one or more microprocessors, and a combination of a DSP and a microprocessor. The communication module 902 may be the transceiver 303 in the physical structure of the network device 30 shown in FIG. 3. The communication module 902 may be a communication port, or may be a transceiver, a transceiver circuit, a communication interface, or the like. Alternatively, the communication interface may communicate with another device by using the foregoing element that has receiving and sending functions. The foregoing element that has receiving and sending functions may be implemented by using an antenna and/or a radio frequency apparatus. The storage module 903 may be the memory 302 in the physical structure of the network device 30 shown in FIG. 3.

When the processing module 901 is a processor, the communication module 902 is a transceiver, and the storage module 903 is a memory, the forwarding device 90 in FIG. 9 in this embodiment of this application may be the network device 30 shown in FIG. 3.

As described above, the forwarding device 80 or the forwarding device 90 provided in embodiments of this application may be configured to implement functions in the method according to any one of embodiments of this application. For ease of description, only a part related to embodiments of this application is shown. For specific technical details that are not disclosed, refer to embodiments of this application.

Figure 10:
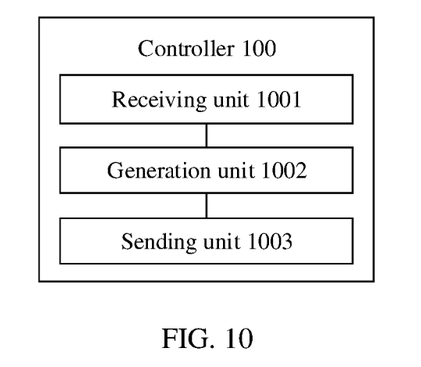
FIG. 10 is a schematic diagram of a structure of a controller according to an embodiment of the present invention.

When functional modules are divided based on corresponding functions, FIG. 10 is a schematic diagram of a possible structure of the controller 100 in this embodiment. As shown in FIG. 10, the controller 100 may include a receiving unit 1001, a generation unit 1002, and a sending unit 1003. The receiving unit 1001 is configured to perform the step S402 in FIG. 4. The generation unit 1002 is configured to perform the step S403 in FIG. 4. The sending unit 1003 is configured to perform the step S404 in FIG. 4. All related content of the steps in this method embodiment may be cited in function descriptions of corresponding functional modules.

Figure 11:
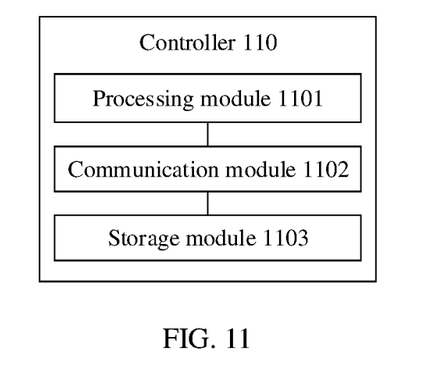
FIG. 11 is a schematic diagram of a structure of another controller according to an embodiment of the present invention.

When an integrated unit is used, FIG. 11 is a schematic diagram of a possible structure of the controller 110 in this embodiment. As shown in FIG. 11, the controller 110 may include a processing module 1101 and a communication module 1102. The processing module 1101 is configured to control and manage an action of the controller 110, and the communication module 1102 is configured to communicate with another device. For example, the processing module 1101 is configured to perform the step S403 in FIG. 4. The processing module 1101 may be further configured to perform steps S402 and S404 in FIG. 4 by using the communication module 1102. The controller 110 may further include a storage module 1103, configured to store program code and data of the controller 110.

The processing module 1101 may be the processor 301 in the physical structure of the network device 30 shown in FIG. 3, or may be a processor or a controller. For example, the processing module 1101 may be a CPU, a general-purpose processor, a DSP, an ASIC, an FPGA or another programmable logic device, a transistor logic device, a hardware component, or any combination thereof. The processing module 1101 may implement or execute various example logical blocks, modules, and circuits described with reference to content disclosed in this application. Alternatively, the processor 1101 may be a combination for implementing a computing function, for example, a combination including one or more microprocessors, and a combination of a DSP and a microprocessor. The communication module 1102 may be the transceiver 303 in the physical structure of the network device 30 shown in FIG. 3. The communication module 1102 may be a communication port, or may be a transceiver, a transceiver circuit, a communication interface, or the like. Alternatively, the communication interface may communicate with another device by using the foregoing element that has receiving and sending functions. The foregoing element that has receiving and sending functions may be implemented by using an antenna and/or a radio frequency apparatus. The storage module 1103 may be the memory 302 in the physical structure of the network device 30 shown in FIG. 3.

When the processing module 1101 is a processor, the communication module 1102 is a transceiver, and the storage module 1103 is a memory, the controller 110 in FIG. 11 in this embodiment of this application may be the network device 30 shown in FIG. 3.

As described above, the controller 100 or the controller 110 provided in embodiments of this application may be configured to implement functions in the method according to any one of embodiments of this application. For ease of description, only a part related to embodiments of this application is shown. For specific technical details that are not disclosed, refer to embodiments of this application.

According to still another aspect, an embodiment of this application provides a communication system, including a controller, and one or more forwarding devices managed by the controller.

In another form of this embodiment, this application provides a computer-readable storage medium. The computer-readable storage medium stores instructions. When the instructions are executed, the node identifier transmission method according to the method embodiments is performed.

In another form of this embodiment, this application provides a computer program product including instructions. When the computer program product is run on a computer, the computer is enabled to perform the node identifier transmission method according to the method embodiments.

An embodiment of this application further provides a chip system. The chip system includes a processor, configured to implement the technical method according to embodiments of the present invention. In an example embodiment, the chip system further includes a memory, configured to store program instructions and/or data that are/is necessary for embodiments of the present invention. In an example embodiment, the chip system further includes a memory, configured to enable the processor to invoke application program code stored in the memory. The chip system may include one or more chips, or may include a chip and another discrete component. This is not specifically limited in this embodiment of this application.

It may be clearly understood by persons skilled in the art that, for the purpose of convenient and brief description, for a detailed working process of the foregoing system, apparatus, and unit, refer to a corresponding process in the foregoing method embodiments.

A person skilled in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a general-purpose or dedicated computer. It may be clearly understood by persons skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical form or other forms.

The units described as separate parts may or may not be physically separate, and parts displayed as units may or may not be physical units, that is, may be located in one position, or may be distributed on a plurality of network units. Some or all of the units may be selected based on actual needs to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the method according to any one of embodiments of this application. The foregoing storage medium includes any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A node identifier transmission method, comprising:
   when a node identifier of a forwarding device changes, sending, by the forwarding device, a changed node identifier to a controller;
   receiving, by the forwarding device, a segment routing (SR) POLICY route from the controller, wherein a target attribute of the SR POLICY route is the changed node identifier; and
   determining, by the forwarding device, that the node identifier matches the target attribute of the SR POLICY route, and forwarding, by the forwarding device, a traffic packet according to the SR POLICY route.

2. The method according to claim 1, wherein the sending, by the forwarding device, a changed node identifier to a controller comprises:
   flooding, by the forwarding device, the changed node identifier.

3. The method according to claim 1, wherein the node identifier comprises a border gateway protocol router-identifier (BGP router-ID), or a traffic engineering router-identifier (TE router-ID).

4. The method according to claim 1, wherein the SR POLICY route further comprises a type indication, and the type indication indicates a type of the node identifier of the forwarding device to be compared with the target attribute of the SR POLICY route; and
   the determining, by the forwarding device, that the node identifier matches the target attribute of the SR POLICY route comprises:
   determining, by the forwarding device, that the node identifier indicated by the type indication matches the target attribute of the SR POLICY route.

5. The method according to claim 1, wherein the target attribute is a route-target attribute.

6. A node identifier transmission method, comprising:
receiving, by a controller, a changed node identifier sent by a forwarding device when a node identifier of the forwarding device changes, wherein the forwarding device is managed by the controller;
generating, by the controller, a SR POLICY route, wherein a head node of the SR POLICY route is the forwarding device, and a target attribute of the SR POLICY route is the changed node identifier; and
sending, by the controller, the SR POLICY route to the forwarding device.

7. The method according to claim 6, wherein the receiving, by a controller, a changed node identifier sent by a forwarding device when a node identifier of the forwarding device changes comprises:
receiving, by the controller, the changed node identifier flooded by the forwarding device when the node identifier of the forwarding device changes.

8. The method according to claim 6, wherein the node identifier comprises a border gateway protocol router-identifier (BGP router-ID), or a traffic engineering router-identifier (TE router-ID).

9. The method according to claim 6, wherein the SR POLICY route further comprises a type indication, and the type indication indicates a type of the target attribute of the SR POLICY route.

10. The method according to claim 6, wherein the target attribute is a route-target attribute.

11. A forwarding device, comprising:
at least one processor; and
one or more memories coupled to the at least one processor and configured to store instructions that, when executed by the at least one processor, cause the forwarding device to:
send a changed node identifier to a controller when a node identifier of the forwarding device changes;
receive a segment routing (SR) POLICY route from the controller, wherein a target attribute of the SR POLICY route is the changed node identifier;
determine that the node identifier matches the target attribute of the SR POLICY route; and
upon determining that the node identifier matches the target attribute of the SR POLICY route, forward a traffic packet according to the SR POLICY route.

12. The forwarding device according to claim 11, wherein the instructions, when executed by the at least one processor, further cause the forwarding device to:
flood the changed node identifier.

13. The forwarding device according to claim 11, wherein the node identifier comprises a border gateway protocol router-identifier (BGP router-ID), or a traffic engineering router-identifier (TE router-ID).

14. The forwarding device according to claim 11, wherein the SR POLICY route further comprises a type indication, and the type indication indicates a type of the node identifier of the forwarding device to be compared with the target attribute of the SR POLICY route; and
the determining that the node identifier matches the target attribute of the SR POLICY route comprises determining that the node identifier indicated by the type indication matches the target attribute of the SR POLICY route.

15. The forwarding device according to claim 11, wherein the target attribute is a route-target attribute.

16. A controller, comprising:
a receiver, configured to receive a changed node identifier sent by a forwarding device when a node identifier of the forwarding device changes, wherein the forwarding device is managed by the controller;
a generator, configured to generate a segment routing (SR) POLICY route whose head node is the forwarding device, wherein a target attribute of the SR POLICY route is the changed node identifier; and
a transmitter, configured to send the SR POLICY route generated by the generator to the forwarding device.

17. The controller according to claim 16, wherein the changed node identifier received by the receiver is flooded by the forwarding device when the node identifier of the forwarding device changes.

18. The controller according to claim 16, wherein the node identifier comprises a border gateway protocol router-identifier (BGP router-ID), or a traffic engineering router-identifier (TE router-ID).

19. The controller according to claim 16, wherein the SR POLICY route further comprises a type indication, and the type indication indicates a type of the target attribute of the SR POLICY route.

20. The controller according to claim 16, wherein the target attribute is a route-target attribute.

* * * * *

UNITED STATES PATENT AND TRADEMARK OFFICE
CERTIFICATE OF CORRECTION

PATENT NO. : 12,218,820 B2
APPLICATION NO. : 17/895241
DATED : February 4, 2025
INVENTOR(S) : Wenyan Li et al.

Page 1 of 1

It is certified that error appears in the above-identified patent and that said Letters Patent is hereby corrected as shown below:

In the Specification

Column 1, Line 46, change "B GP" to --BGP--; and

Column 6, Line 18, change ""I"" to --"/"--.

Signed and Sealed this
Fourth Day of March, 2025

Coke Morgan Stewart
*Acting Director of the United States Patent and Trademark Office*